United States Patent Office 3,676,255
Patented July 11, 1972

3,676,255
BONDING METALS TO ELASTOMER SYSTEMS
Andries Voet, Borger, Tex., assignor to J. M. Huber Corporation, Locust, N.J.
No Drawing. Filed Nov. 18, 1970, Ser. No. 90,801
Int. Cl. B32b 15/06; B44d 1/34; C08c 11/18
U.S. Cl. 156—306
1 Claim

ABSTRACT OF THE DISCLOSURE

Rubber vulcanizates reinforced with ozone treated furnace carbon blacks show improved adhesion to a surface of brass.

BACKGROUND OF THE INVENTION

In general, the present invention relates to rubber vulcanizates and in particular to the use of ozone treated furnace carbon blacks to produce improved adhesion of such systems to metallic surfaces.

The adhesion of vulcanizates to metallic wires used in belted tires has long been a major problem in the industry. The separation of the vulcanizate and the metallic belt wires is frequently observed after relatively short periods of roadwear.

The prior art has tried a number of the various grades of carbon black as reinforcing agents without successfully solving this problem. In addition, the prior art has attempted a wide variety of additional approaches to the problems of bonding elastomers and metals without having solved the problem to the industry's satisfaction. For an indication of some of the prior art approaches considered see, for example, U.S. Pats. 2,720,479; 3,054,-712; 3,423,270; 3,425,886; 3,476,642; 3,480,508; and British Pat. 1,169,366.

In general, the industry has considered channel black to be the best product available in solving this problem.

As noted above, a number of other carbon blacks, including furnace blacks, both untreated and treated with modifying agents, have been tried as replacements for channel blacks in the solution of the elastomer-metal bonding problem. However, these blacks have uniformly resulted in elastomer-metal adhesion inferior to that produced by channel black. Since channel black represents the generally accepted minimum requirement for an acceptable tire, the search for an acceptable substitute material for channel black in the solution of the bonding problem has continued.

As will be noted below, the present invention relates to the new use of ozonized furnace black to produce vulcanizate to metal bonding in belted tires.

The methods of producing an ozonized furnace black are well known, for example, see U.S. Pats. 2,682,448; 3,247,003; 3,216,843; 3,245,820; 3,364,048; 3,353,980; 3,333,979; 3,383,232; 3,301,694; and 3,495,999.

Ozonized carbon black has been and is used in a number of applications in the ink and paint industry and has been used in elastomer systems to provide special properties (such as disclosed in British Pat. 1,041,848) and reinforcing of the elastomer per se (such as disclosed in British Pat. 1,015,745). However, it has not, to the inventor's knowledge, been shown in the prior art that ozonized carbon black would provide adhesion superior to channel blacks in elastomer to metal bonding systems and this fact does not appear to have been recognized by the industry.

SUMMARY OF THE INVENTION

Accordingly, it is an object of the present invention to provide a new, effective solution to the bonding problem between elastomers and metals and thereby overcome the deficiencies of the prior art as noted above.

Other objects and a fuller understanding of the invention may be had by referring to the following description and claims.

The present invention overcomes the deficiencies of the prior art attempts at a solution of the bonding problem and achieves its objectives by the use of ozone treated furnace carbon blacks to reinforce rubber vulcanizates and simultaneously produce improved adhesion of the rubber vulcanizates to metallic surfaces.

DESCRIPTION OF THE PREFERRED EMBODIMENT

The production of an ozonized furnace carbon black may be achieved by employing the teachings of the above noted patents on the subject.

For simplicity and reproducibility the expedient of exposing a furnace carbon black to an atmosphere of air or oxygen containing ozone for a predetermined time has been employed in the examples below.

It has been found, as shown in the examples below, that such an ozonized furnace carbon black when compounded in a conventional rubber formulation and vulcanized in contact with the brass surface results in a vulcanizate to metal adhesion superior to that produced by channel blacks.

In order to facilitate the understanding of the present invention, a series of examples demonstrating the superior adhesion will be set forth below. These examples are not to be construed as limiting the invention but are exemplary only.

EXAMPLE I

As a control, forty-five parts of a channel carbon black were compounded with one hundred parts of number one smoked sheets in a standard formulation containing minor parts of zinc oxide, stearic acid, pine tar, sulfur and additives. Test pads having dimensions of approximately 1 x 8 x ¼ inches were prepared. These test pads together with a plurality of conventional brass plated wires used in tire belts positioned transverse to the length of and between two of the test pads were cured at 300° F. for a period of time necessary to reach an optimum state of cure. These test blocks were then tested according to the ASTM "Standard Method of Testing for Adhesion of Vulcanized Rubber to Wire Cord" (D2229–68). In repeated tests the channel black produced an average adhesive force of 280 pounds and a percentage of coverage of elastomer on the wire following failure of the bond of approximately 75%.

EXAMPLE II

As a further control, Example I was repeated employing an untreated high structure, high abrasion furnace carbon black in lieu of the channel black of Example I. In repeated tests the average adhesive force produced by this bond was 250 pounds and the percentage of cover obtained was of the order of 25%.

EXAMPLE III

Example I was repeated with a high structure, high abrasion furnace black which had been ozonized by treatment in an ozonized oxygen atmosphere containing 1% ozone at room temperature for 60 minutes. The bond produced in repeated tests had an average adhesive force in excess of approximately 360 pounds and an average coverage on the order of 85%.

EXAMPLE IV

Example I was repeated with a high structure, high abrasion furnace black which had been ozonized by treatment in an ozonized oxygen atmosphere containing 1% ozone at room temperature for 120 minutes. In repeated tests the bond produced showed an average adhesive force in excess of approximately 360 pounds and an average coverage on the order of 95%.

EXAMPLE V

Example IV was repeated using an intermediate super abrasion furnace (ISAF) black. In repeated tests the bond showed an average adhesive force in excess of approximately 360 pounds and an average coverage on the order of 90%.

EXAMPLE VI

Example III was repeated using an elastomer blend of 35 parts of styrene-butadiene rubber (SBR) and 65 parts of polyisoprene rubber in lieu of one hundred parts of number one smoked sheets of Example I. In repeated tests the bond showed an average adhesive force in excess of approximately 360 pounds and an average coverage on the order of 90%.

The reason that reference is made in the above examples to adhesion forces "in excess of" is that in approximately 35% of the tests run the strength of the adhesive bond produced between the elastomer and the wire exceeded the tensile strength of the wire thus causing the wire to break before the adhesive bond failed. In the other cases the high percentage of coverage of the wire on the order of 85–95% indicates that the failure was cohesive (elastomer-elastomer) rather than adhesive (elastomer-metal).

The results of the above examples may be clearly compared in the following table:

TABLE I

| Example No. | Type of black | Adhesion (pounds) | Coverage (percent) |
|---|---|---|---|
| I | Channel | 280 | 75 |
| II | Furnace | 250 | 25 |
| III | Ozonized furnace | >360 | 85 |
| IV | do | >360 | 95 |
| V | do | >360 | 90 |
| VI | do | >360 | 90 |

While the applicant does not wish to be bound by any particular theory or explanation of these unexpected results, it is believed that the strong adhesion of the ozonized black bonds is caused by the presence of carboxyl groups introduced on the carbon black by the process of ozonization.

The following table shows the effect of ozone treatments at various concentrations, times and temperatures on the production of carboxyl group and oxygen content compared with a typical channel black which has approximately 3% oxygen content and a carboxylic group content of 30 microequivalents per gram of carbon black:

TABLE II

| Treatment time (min.) | Wt. percent O₃ in stream | Temperature (° C.) | O₂ content (percent) | Carboxyl content (μeg./gm.) |
|---|---|---|---|---|
| 5 | 0.5 | 22 | 1.4 | 16 |
| 10 | 0.5 | 22 | 1.5 | 22 |
| 15 | 0.5 | 22 | 1.5 | 35 |
| 5 | 1.0 | 22 | 1.3 | 19 |
| 10 | 1.0 | 22 | 1.5 | 44 |
| 15 | 1.0 | 22 | 1.6 | 56 |
| 5 | 2.0 | 22 | 1.3 | 40 |
| 10 | 2.0 | 22 | 1.6 | 72 |
| 15 | 2.0 | 22 | 1.9 | 88 |
| 5 | 0.5 | 100 | 1.3 | 16 |
| 10 | 0.5 | 100 | 1.7 | 31 |
| 15 | 0.5 | 100 | 1.6 | 44 |
| 5 | 1.0 | 100 | 1.6 | 21 |
| 10 | 1.0 | 100 | 1.6 | 42 |
| 15 | 1.0 | 100 | 1.7 | 50 |
| 5 | 2.0 | 100 | 1.4 | 29 |
| 10 | 2.0 | 100 | 1.8 | 54 |
| 15 | 2.0 | 100 | 1.9 | 77 |
| 5 | 2.0 | 30 | 1.3 | 41 |
| 10 | 2.0 | 30 | 1.6 | 72 |
| 15 | 2.0 | 30 | 2.0 | 80 |
| 30 | 2.0 | 30 | 2.4 | 107 |
| 60 | 2.0 | 30 | 2.7 | 246 |
| 180 | 2.0 | 30 | 4.2 | 432 |

The method of determining the carboxyl content is set forth by J. B. Donnet and P. Marguier, C. R. Acad. Sci., Paris, 239, 1038 (1954); 242, 771 (1956).

In order to obtain the benefits of the present invention it is necessary to produce carboxyl groups on the carbon black in excess of those present on channel black, namely, more than 30 microequivalents per gram of carbon black. Any method of oxidation or ozonization which will produce the desired carboxyl groups may, of course, be employed.

The amount of ozonized carbon black added may, of course, vary as those skilled in the art are aware between 10 parts to over 100 parts of ozonized carbon black per 100 parts of rubber in the composition. Less than 10 parts of ozonized black is not effective in most applications and more than 100 parts of ozonized black in most typical elastomers tends to produce materials which cannot be properly handled in view of their low resilience.

The present invention is thus not limited to the particular means of ozonization or quantity of addition but covers all changes and modifications of the specific method and examples of the invention herein disclosed which do not constitute departures from the spirit and scope of the claimed invention.

What is claimed is:

1. A method of producing an improved adhesive bond between rubber vulcanizates and a brass surface comprising adding at least 10 parts by weight of ozonized furnace carbon black per 100 parts of rubber in the composition, said ozonized carbon black having at least 30 microequivalents of carboxyl groups/gram of carbon black present on its surface, and vulcanizing the rubber composition in the presence of sulfur while in contact with the brass surface.

References Cited

UNITED STATES PATENTS

| 2,468,239 | 4/1949 | Saulino | 117—133 X |
| 2,641,535 | 6/1953 | Cines | 260—763 X |
| 2,867,540 | 1/1959 | Harris | 106—307 |
| 3,198,690 | 8/1965 | Starke | 161—159 |
| 3,329,626 | 7/1967 | Teter et al. | 252—445 |

ROBERT F. BURNETT, Primary Examiner

R. A. DAWSON, Assistant Examiner

U.S. Cl. X.R.

106—307; 117—128.7, 133; 156—338; 161—221, 239; 260—763